United States Patent Office 2,991,148
Patented July 4, 1961

2,991,148
DECONTAMINATION OF ACIDIC PLUTONIUM CONTAINING SOLUTIONS
Ara J. Mooradian, Deep River, Ontario, Canada, assignor to Atomic Energy of Canada Limited, Ottawa, Ontario, Canada
No Drawing. Filed Jan. 27, 1956, Ser. No. 561,920
Claims priority, application Canada Feb. 28, 1955
2 Claims. (Cl. 23—14.5)

This invention relates to the decontamination of acidic waste solutions in the processing of radio active materials, in order that the solutions may be disposed of without creating health hazards to the public.

The object of the invention is to provide a convenient and economical method of removing trace amounts of plutonium and/or fission products which are capable of changing the valence form by reduction or oxidation.

Ion exchange resins are well known and have been used for decontamination purposes.

It has now been found that such ion exchange resins may be used for decontamination of the solutions here in question by first treating them with a solution of a ferrous salt to convert the resin from the $H^+$ or $Na^+$ form to the $Fe^{II}$ form. This is accomplished by passing over the resin, preferably in a column, a ferrous iron solution, such as ferrous sulphate, ferrous nitrate, ferrous chloride or ferrous sulphamate. The resin then containing the $Fe^{II}$ ion, hereafter referred to as a modified ion exchange resin, is ready to receive the solution to be treated.

The acid solution, preferably above a pH of 1, is passed through the column over the modified resin, which reduces the contaminating materials to the lower valence state in which form they are adsorbed by the resin as the solution passes over the modified resin. It is preferable to connect a second column, containing unmodified resin, in series with the main column to insure practically complete adsorption.

To illustrate the operation and effect of the method using a modified reducing resin as just described the following is given.

In order to obtain a sufficiently high decontamination factor, of say 60 or more, without prohibitive cost, it was found necessary to provide a high concentration of the reducing or the oxidizing agent in contact with the solution to be decontaminated. It was found that such decontamination is readily obtained when the so modified ion exchange resin is used instead of the normal ion exchange resin, such as "Dowex 50." The cost incurred by direct addition of the reagent to the solution was found to be prohibitive and complexing agents tend to form and stabilize plutonium so that it passes through the resin column without being adsorbed.

The following tables illustrate the decontaminating effect of the modified resin.

(1) *Chalk River tap water at pH=1*

| Through Two Column System, i.e. $Fe^{II}$ modified "Dowex 50" resin followed by column of untreated "Dowex 50" resin Influent Pu= $1.91 \times 10^{-3}$ mg./litre | | | Through Untreated "Dowex 50" resin Column—Influent Pu= $1.52 \times 10^{-3}$ | | |
|---|---|---|---|---|---|
| Vol. Throughput | Pu in effluent in mg./litre | D.F. | Vol. Throughput | Pu in effluent in mg./litre | D.F. |
| 50 mls | $2.9 \times 10^{-6}$ | 660 | 40 mls | $5.79 \times 10^{-4}$ | 2.6 |
| 70 mls | $7.6 \times 10^{-6}$ | 250 | 55 mls | $4.41 \times 10^{-4}$ | 3.4 |
|  |  |  | 70 mls | $4.24 \times 10^{-4}$ | 3.6 |

One of the commercial detergents "Alconox" commonly used was found to have a detrimental effect on the decontamination of waste solutions but the modified resin is effective as shown in the following table.

2

| Two Column System as in Table 1 Tapwater, 500 p.p.m. Alconox, Pu=$1.91 \times 10^{-3}$ mg./litre | | | Untreated Dowex 50 Column Tapwater, 600 p.p.m. Alconox, Pu=$1.64 \times 10^{-3}$ mg./litre | | |
|---|---|---|---|---|---|
| Vol. Throughput | Pu in Effluent in mg./litre | D.F. | Vol. Throughput | Pu in Effluent in mg./litre | D.F. |
| 50 | $3.04 \times 10^{-6}$ | 620 | 40 | $1.3 \times 10^{-3}$ | 1.3 |
| 70 | $9.2 \times 10^{-6}$ | 207 | 60 | $1.4 \times 10^{-3}$ | 1.2 |
|  |  |  | 80 | $1.36 \times 10^{-3}$ | 1.2 |

Some of the poorest solutions from the decontamination centre and containing various detergents, soap, citric acid, varsol, wetting agents, starch, etc., were effectively decontaminated as shown in the following table.

(3) *Modified "Dowex" 50 resin column*

| Vol. Throughput | Pu in Effluent in mg./litre | D.F. |
|---|---|---|
| 50 | $1.2 \times 10^{-5}$ | 100 |
| 100 | $3.8 \times 10^{-5}$ | 330 |
| 150 | $1.1 \times 10^{-5}$ | 113 |
| 200 | $8.7 \times 10^{-6}$ | 1,430 |
| 250 | $1 \times 10^{-5}$ | 125 |
| 300 | $4.7 \times 10^{-6}$ | 2,660 |
| 350 | $3.8 \times 10^{-5}$ | 330 |
| 450 | $5.7 \times 10^{-6}$ | 2,190 |
| 550 | Nil | >3,000 |

Those skilled in the art will recognize that an ion exchange resin modified by substitution of an oxidizing ion, instead of the reducing ion $Fe^{II}$ will serve the purpose and the term modified ion exchange resin is intended to include such.

When the modified ion exchange resin capacity for adsorption is effectively exhausted it is replaced with fully active modified resin.

What is claimed is:

1. In the decontamination of radioactive waste acidic solutions containing plutonium the method which comprises treating a normal ion exchange resin with a ferrous solution to substitute the $Fe^{II}$ ion therein and passing the acid solution at a pH of at least 1 through a column of said modified resin to reduce the plutonium to a lower valence state and cause it to be adsorbed by the resin as the acid solution passes through the column in contact with said so modified resin.

2. The method defined in claim 1 wherein the so treated acid solution is further decontaminated by passing it through a column of normal ion exchange resin.

References Cited in the file of this patent
UNITED STATES PATENTS

| 2,616,847 | Ginell | Nov. 4, 1952 |
| 2,793,753 | Webster | May 28, 1957 |
| 2,811,415 | Seaborg | Oct. 29, 1957 |
| 2,811,416 | Russell et al. | Oct. 29, 1957 |

OTHER REFERENCES

Journ. Amer. Chem. Soc., vol. 69, November 1947, article by E. R. Tompkins and others, pages 2769–2776. (Copy in 23/50, B.E.)

"Ind. and Eng. Chem.", January 1955, page 61. Article by W. W. Walters and Others. (Copy in 23/50 B.E.)